United States Patent
Nicholas

(10) Patent No.: US 8,613,897 B2
(45) Date of Patent: Dec. 24, 2013

(54) DENSIFIED FUMED METAL OXIDES AND METHODS FOR PRODUCING THE SAME

(75) Inventor: Christopher P. Nicholas, Evanston, IL (US)

(73) Assignee: UOP LLC, Des Plaines, IL (US)

( * ) Notice: Subject to any disclaimer, the term of this patent is extended or adjusted under 35 U.S.C. 154(b) by 326 days.

(21) Appl. No.: 12/853,989

(22) Filed: Aug. 10, 2010

(65) Prior Publication Data

US 2012/0039782 A1     Feb. 16, 2012

(51) Int. Cl.
    *C01B 33/00*     (2006.01)
(52) U.S. Cl.
    USPC .............................. 423/335; 423/625; 423/628
(58) Field of Classification Search
    USPC .......................................... 423/335, 625, 628
    See application file for complete search history.

(56) References Cited

U.S. PATENT DOCUMENTS

| | | | |
|---|---|---|---|
| 4,028,124 A | 6/1977 | Bihuniak et al. | |
| 4,042,361 A | 8/1977 | Bihuniak et al. | |
| 4,047,966 A | 9/1977 | Bihuniak et al. | |
| 4,126,422 A | 11/1978 | Brandes | |
| 4,200,445 A | 4/1980 | Bihuniak et al. | |
| 4,326,852 A * | 4/1982 | Kratel et al. | ................. 23/293 R |
| 4,409,171 A | 10/1983 | Leon et al. | |
| 4,419,115 A | 12/1983 | Johnson, Jr. et al. | |
| 4,877,595 A * | 10/1989 | Klingle et al. | ................. 423/335 |
| 5,030,433 A | 7/1991 | Mehrotra | |
| 5,527,423 A * | 6/1996 | Neville et al. | ................. 438/693 |
| 6,156,285 A * | 12/2000 | Adams et al. | ................. 423/335 |
| 6,849,242 B1 | 2/2005 | Koeppler et al. | |
| 2006/0216430 A1 * | 9/2006 | Deng et al. | ................. 427/456 |
| 2009/0163637 A1 | 6/2009 | Li et al. | |

OTHER PUBLICATIONS

Lee, H., et al., Microstructure development of high-purity mullite by high energy mixing of fumed oxide powders, Scripta Materialia, v 50, n. 8, p. 1175-1179, Apr. 2004.

Hartmann, W., et al., Fumed oxides as base materials for ceramic applications, Materials Science & Engineering A: Structural Materials: Properties, Microstructure and Processing, v A109, n 1-2, p. 243-246, Mar. 1989.

* cited by examiner

*Primary Examiner* — Steven Bos

(74) *Attorney, Agent, or Firm* — Mark Goldberg

(57) ABSTRACT

A method for producing a densified fumed metal oxide having an increased bulk density and substantially the same surface area as an undensified fumed metal oxide with the same molecular composition is provided. The fumed metal oxide is wetted with a solvent to form a wetted fumed metal oxide. The wetted fumed metal oxide is dried to form a dried fumed metal oxide. The dried fumed metal oxide is calcined.

2 Claims, 1 Drawing Sheet

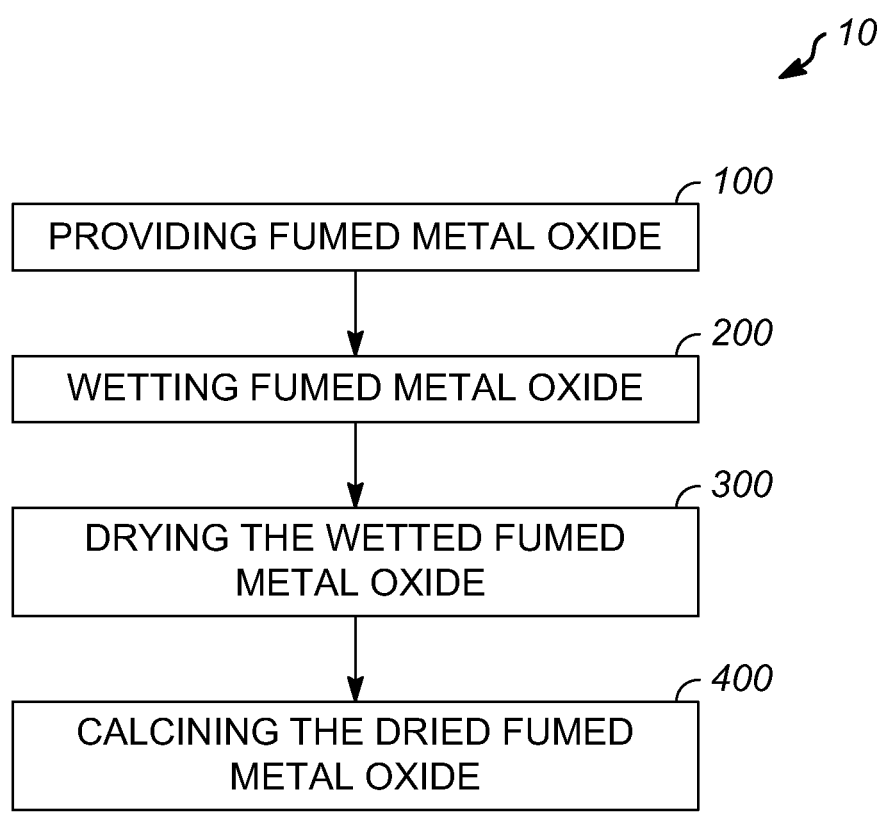

DENSIFIED FUMED METAL OXIDES AND METHODS FOR PRODUCING THE SAME

FIELD OF THE INVENTION

The present invention generally relates to densified fumed metal oxides and methods for producing densified fumed metal oxides, and more particularly relates to densified fumed metal oxides having substantially the same surface area as undensified fumed metal oxides and methods for producing the same.

DESCRIPTION OF RELATED ART

Fumed metal oxides are high purity powdered materials (typically greater than 99% purity) useful as catalyst supports and as precursors for material synthesis, such as zeolites. They are typically produced via the injection of one or more volatile metal compounds (usually high purity metal chlorides) into a stream of hydrogen and air. This high temperature process produces an aggregated, nano-structured metal oxide powder with high purity. Their purity is highly desired, as impurities may interfere with catalytic processes, weaken the catalytic support, poison the catalyst, etc. Fumed metal oxides represent the purest metal oxides, while mined metal oxides represent the least pure, with precipitated metal oxides in the middle.

Fumed metal oxides, due to their method of manufacture, have very low bulk densities. "Bulk density" as used herein means the quantity or mass of the fumed metal oxide per unit volume. Because of their low density, they are not typically used in a catalytic reactor where catalyst volume is limited or fixed, despite the desire for their purity. The typical density for a catalyst used in a catalytic reactor is about 0.2-1.5 g/ml whereas fumed metal oxides have significantly lower densities. For example, CAB-O-SIL® TS-610 fumed silica (available from Cabot Corporation, Boston, Mass., USA) has a density of about 0.04 g/ml and AEROSIL® AluC fumed alumina (available from Evonik Corporation, Essen Germany) has a density of about 0.06 g/ml.

To take advantage of their high purity and use them in catalytic reactors, attempts have been made to densify fumed metal oxides, for example, by mechanical compression of undensified fumed metal oxides (i.e., the fumed metal oxide prior to any densification treatment). However, conventional densifying undesirably results in a decrease in surface area. A decrease in surface area may impact catalytic activity. For example, in catalyst preparation, a metal and/or metal oxide may be incorporated onto fumed metal oxide catalyst supports. Thereby a large portion of the metal and/or metal oxide is exposed as surface atoms where the reaction can take place. If the surface area of the catalyst support is reduced, the area where the metal or metal oxide particles can reside is reduced, leading to a reduction in metal loading or an increase in metal particle size. This leads to a harmful change in catalyst activity or selectivity. Conventional densifying may also result in an undesired change in crystalline phase of the fumed metal oxide.

Accordingly, it is desirable to provide novel densified fumed metal oxides and methods for producing the same. In addition, it is also desirable to densify the fumed metal oxides without substantially altering other key properties, such as surface area and crystalline phase. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Methods are provided for producing a densified fumed metal oxide. In accordance with one exemplary embodiment, the method comprises wetting a fumed metal oxide with a solvent to form a wetted fumed metal oxide. The wetted fumed metal oxide is dried to form a dried fumed metal oxide. The dried fumed metal oxide is calcined.

Methods are provided for densifying a fumed metal oxide, in accordance with yet another exemplary embodiment of the present invention. The method comprises wetting a fumed metal oxide with a solvent. The solvent comprises water, an organic solvent or a combination thereof if the fumed metal oxide comprises a hydrophilic fumed metal oxide. The solvent comprises an organic solvent, or a combination of organic solvent and water if the fumed metal oxide comprises a hydrophobic fumed metal oxide. The wetted fumed metal oxide is dried at a temperature range of about 100° C. to about 250° C. for an effective drying time to produce a dried fumed metal oxide. The dried fumed metal oxide is calcined at a temperature no greater than 600° C. to a selected loss on ignition (LOI) at 900° C.

Densified fumed metal oxides produced by the methods are also provided in accordance with another exemplary embodiment of the present invention. The densified fumed metal oxides comprise a fumed metal oxide having a density that is about 300% to about 1000% greater than an undensified fumed metal oxide having the same molecular composition as the undensified fumed metal oxide. The densified fumed metal oxide has substantially the same surface area as the undensified fumed metal oxide.

BRIEF DESCRIPTION OF THE DRAWINGS

The present invention will hereinafter be described in conjunction with the following drawing figures, wherein like numerals denote like elements, and wherein:

FIG. 1 is a flow diagram of a method for producing a densified fumed metal oxide, according to exemplary embodiments of the present invention.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments of the present invention are directed to densified fumed metal oxides and methods for producing the same. The densified fumed metal oxides have a high bulk density but with substantially the same surface area and high purity as undensified fumed metal oxides, making them superior for use in catalytic processes, such as catalyst supports and as precursors for material synthesis. Various metals and metal oxides may also be incorporated without restriction onto fumed metal oxide catalyst supports.

As shown in FIG. 1, a method 10 for producing a densified fumed metal oxide begins by providing a fumed metal oxide (step 100). Exemplary suitable fumed metal oxides include fumed silica, fumed alumina, fumed titania, fumed zirconia, fumed ceria, fumed zinc oxide, and combinations thereof.

Fumed metal oxides are commercially available from, for example, Cabot Corporation (Boston, Mass., USA) and Evonik Corporation (Essen, Germany).

The fumed metal oxide may be hydrophilic (i.e., capable of being wetted by or taking up water) or hydrophobic (i.e., not capable of being wetted by water or taking up water), as known to one skilled in the art. Hydrophilic fumed metal oxides are easily wetted by water and will adsorb water from the humidity in the air. "Adsorb" or "adsorption" as used herein means the adhesion of a layer of molecules (gas or liquid) to the surface of the fumed metal oxide.

Hydrophobic fumed metal oxides, on the other hand, cannot be wetted by water (they will float on water) without the use of surfactants or co-solvents and will not adsorb moisture from the humidity in the air during storage. "Co-solvents" as used herein means an organic solvent that is water miscible such as acetone, methanol, ethyl alcohol, isopropyl alcohol, ethylene glycol, propylene glycol, and most glycol ether solvents or the like, and combinations thereof. The surface chemistry of fumed metal oxides may be altered, by methods well known in the art, to change the hydrophilic or hydrophobic nature of the fumed metal oxide. For example, the surface hydroxyls of a fumed metal oxide can be treated with a silicon containing compound to replace —OH groups with —Si(CH$_3$)$_x$ groups, changing a hydrophilic metal oxide to a hydrophobic metal oxide. CAB-O-SIL® TS-610 is an example of a hydrophobic fumed silica produced by such a technique.

Still referring to FIG. 1, method 10 continues with wetting the fumed metal oxide with a solvent to form a wetted fumed metal oxide (step 200). The wetted fumed metal oxide has a mud or paste-like consistency. The solvent comprises water, an organic solvent, or a combination thereof, wherein the mass ratio of organic solvent to water is from 0 to 10 and is most preferably less than 1, if the fumed metal oxide comprises a hydrophilic fumed metal oxide. If the fumed metal oxide comprises a hydrophobic fumed metal oxide, the solvent comprises an organic solvent, or a combination of water and the organic solvent (i.e., the co-solvent), wherein the mass ratio of water to organic solvent is from 0 to 10 and is most preferably about 1. The fumed metal oxide is wetted with a solvent in a mass ratio of about 1:1 to about 1:20. The optimal fumed metal oxide to solvent ratio is determined experimentally by measuring the amount of solvent necessary to wet the fumed metal oxide to a mud-like consistency without having an excess liquid phase present and is impacted by the composition of the fumed metal oxide and the solvent and is likely affected by the particle size and surface composition of the fumed metal oxide. As noted previously, the organic solvent is miscible with water and includes acetone, methanol, ethyl alcohol, isopropyl alcohol, ethylene glycol, propylene glycol, and most glycol ether solvents, or the like, and combinations thereof. The wetting step is performed at a neutral pH of 7.0 without the addition of any acid.

Method 10 continues with drying the wetted fumed metal oxide (step 300). In this regard, the wetted fumed metal oxide is heated to a temperature in a range from about 100° to about 250° C., preferably about 120° C., for an effective drying time to produce a dried fumed metal oxide. Heat is supplied by any conventional means. The "effective drying time" ranges from about four hours to about 5 days. The effective drying time varies, depending on the metal oxide, the temperature, the hydroxyl group concentration and the solvent used. For example, the effective drying time when using a mixture of methanol and water (Example 2 below) is much less than that for when water is the solvent (Example 1 below). The wetted fumed metal oxide is dried until the surface of the oxide contains cracks and is no longer a paste consistency, but quite solid. While not intending to be bound by any theory, in general, the drying step removes the solvent from the wetted fumed metal oxide.

Referring still to FIG. 1, the dried fumed metal oxide is then calcined to produce the densified fumed metal oxide (step 400). As used herein, "calcining" means heating the fumed metal oxide powder to a temperature hot enough to remove the remaining adsorbed water and hydroxyl groups, but not hot enough to melt the powder, preferably to a temperature in the range from about 300° C. to about 600° C. The dried fumed metal oxide is calcined slowly, increasing the temperature ramp at a rate of from about 2° C. to about 5° C. per minute and then holding at the maximum temperature from between 2 and 24 hours. The dried fumed metal oxide may be calcined in, for example, a furnace such as a rotary kiln, box furnace, belt dryer or the like. The dried fumed metal oxide is calcined to a selected loss on ignition (LOI) at 900° C. In a preferred embodiment, the dried fumed metal oxide is calcined to a LOI at 900° C. of about 1 to about 15 weight percent. Depending on the purpose for the densified fumed metal oxide, the dried fumed metal oxide may be calcined to a higher or a lower LOI at 900°.

Using the various embodiments of the method 10, the density of the fumed metal oxide is increased to a level that is about 300 to about 1000 percent greater than the density of the undensified fumed metal oxide with the same molecular composition. In a preferred embodiment, it is desired to density the fumed metal oxide to a density of conventional naturally occurring (mined) and precipitated metal oxides, i.e., about 0.2 to about 1.5 g/ml. The surface area of the densified fumed metal is substantially the same as the undensified fumed metal oxide and the purity of the fumed metal oxide is preserved. As used herein, the term "substantially the same" means within about 10%, preferably within 5%, more preferably within 1%. Surface area may be determined, for example, by N$_2$ adsorption using the conventional BET method of analysis (*J. Am. Chem. Soc.*, 1938, 60, 309-16) of the adsorption isotherm as implemented in Micromeritics ASAP 2010 software. In addition, the crystalline phase of the densified fumed metal oxide, as determined by x-ray diffraction, remains the same as the undensified fumed metal oxide.

The following are examples of densified fumed metal oxides prepared in accordance with exemplary embodiments. The examples are provided for illustration purposes only, and are not meant to limit the various embodiments of the present invention in any way.

EXAMPLES

Example 1

20.0 g AEROSIL® AluC fumed alumina (a hydrophilic metal oxide) was wetted with 100 g water and dried at about 120° C. for 48 hours followed by calcination at a rate of 2° C./minute to about 500° C. and held for 15 h. The measured density of the fumed alumina increased from 0.06 g/mL to 0.48 g/mL with such densifying treatment. The surface area was constant at 97 m$^2$/g. By x-ray diffraction, it was determined that the crystalline phase was a mixture of delta and theta phases prior to and following the densification treatment.

Example 2

1.07 g CAB-O-SIL® TS-610 fumed silica (a hydrophobic SiO$_2$ due to treatment with Me$_2$SiCl$_2$) was wetted with 10 mL of a 50:50 mixture of methanol and water, dried at about 120° C. for 6 hours followed by calcination at a rate of 2° C./minute to about 500° C. The measured density of the fumed silica increased from 0.04 g/ml to 0.19 g/ml. The surface area was constant at 136 m$^2$/g.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A densified fumed silica comprising;
   a fumed metal oxide silica having a density that is from 475% to about 1000% greater than an undensified fumed silica and having the same molecular composition as the undensified fumed silica, while retaining substantially the same surface area as the undensified oxide silica.

2. A densified fumed alumina comprising;
   a fumed alumina having a density that is about 800% to about 1000% greater than an undensified fumed alumina and having the same molecular composition as the undensified fumed alumina, while retaining substantially the same surface area as the undensified fumed alumina.

* * * * *